(12) United States Patent
Kinjo

(10) Patent No.: US 7,286,112 B2
(45) Date of Patent: Oct. 23, 2007

(54) IMAGE DISPLAY METHOD

(75) Inventor: Naoto Kinjo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 690 days.

(21) Appl. No.: 10/255,102

(22) Filed: Sep. 26, 2002

(65) Prior Publication Data

US 2003/0078966 A1    Apr. 24, 2003

(30) Foreign Application Priority Data

Sep. 27, 2001  (JP) ............................ 2001-296301

(51) Int. Cl.
*G09G 5/00* (2006.01)
(52) U.S. Cl. ........................ 345/156; 345/1.1
(58) Field of Classification Search ................ 345/156, 345/157, 173, 168, 1.1–1.3; 178/18.01, 18.1; 341/22, 23
See application file for complete search history.

(56) References Cited

U.S. PATENT DOCUMENTS

| | | | |
|---|---|---|---|
| 5,504,675 A * | 4/1996 | Cragun et al. ................. | 705/14 |
| 5,615,391 A * | 3/1997 | Klees ............................ | 710/19 |
| 6,163,822 A * | 12/2000 | Christian et al. ............. | 710/58 |
| 6,256,046 B1 * | 7/2001 | Waters et al. ................. | 345/473 |
| 6,535,770 B1 * | 3/2003 | Van Laethem ................ | 700/83 |
| 2002/0063679 A1 * | 5/2002 | Goodwin et al. ............ | 345/156 |

FOREIGN PATENT DOCUMENTS

| | | |
|---|---|---|
| JP | 08-018900 A | 1/1996 |
| JP | 09-217873 A | 8/1997 |
| JP | 11-085861 A | 3/1999 |
| JP | 11-250009 | 9/1999 |
| JP | 2000-029932 A | 1/2000 |
| JP | 2000-187474 A | 7/2000 |
| JP | 2000-324555 | 11/2000 |
| JP | 2001-084662 A | 3/2001 |
| JP | 2001-093230 A | 4/2001 |

* cited by examiner

*Primary Examiner*—Regina Liang
(74) *Attorney, Agent, or Firm*—Sughrue Mion, PLLC

(57) ABSTRACT

The image display method displays image information to be viewed by a person on display screens of a plurality of display apparatuses, is capable of setting a mode of display as a registrable mode which includes combination of at least two selectable items selected from the group consisting of presence or absence of need for tracking display, presence or absence of need for continued display, presence or absence of need for identification of the person, and setting of a stop condition and controls the display of the image information on the display screens of the plurality of display apparatuses in accordance with the setting of the registrable mode.

19 Claims, 5 Drawing Sheets

IMAGE DISPLAY METHOD

BACKGROUND OF THE INVENTION

This invention relates to an image display method, particularly to an image display method capable of displaying an image in response to a person located in front of an image display apparatus.

The recent development of computer networks has made mobile computing a commonplace, in which people use notebook-sized PCs having communication capabilities, PDAs (personal digital assistants), cell phones, etc. and send or receive information on the Internet, by e-mail or some other means so that it can be browsed while the user is moving.

Japanese Patent Laid-Open No. 250009/1999 discloses a network server apparatus with which web data in request is so converted as to comply with the specifications of a PDA and permit browsing of a desired web page with the PDA, as well as a web data conversion system which converts web data to allow for faster browsing of a web page with the PDA.

Japanese Patent Laid-Open No. 2000-324555 discloses a mobile terminal device that is to be connected to the Internet via radio communication means and which receives initial screen information for the address designated with browsing software so that the received information is represented on a display section, characterized by having initial screen setting means capable of selectively executing a home page displaying action for receiving data for the home page of a preset address or a designated page displaying action for designating the page of another address and receiving data for that page, so that the user can receive the necessary information rapidly and correctly.

When you are watching television in a room of your home, you may sometimes have to leave the room for some reason (e.g. taking a bath or washing your hands). If you want to continue to watch the TV program, you must either carry a portable TV set along or install a TV receiver at every place you are supposed to go to, turn on the TV receiver in the place you have moved to and tune it to the program you have been watching.

However, the practices described above have their own problems. Using the terminal devices of Japanese Patent Laid-Open Nos. 250009/1999 and 2000-324555 in order to browse information on the Internet while you are moving requires that you always carry such terminal devices along. This is also true with the case of carrying a portable TV set along in order to ensure that you can watch a TV program without interruption wherever you go in your home.

The method of installing a TV receiver in every place of your home to which you are supposed to go is not an exception and has two problems. For one thing, a conventional CRT-based TV requires a large space of installation. Secondly, in order to avoid the need to switch a particular TV receiver on and off, you must carry a remote control along.

SUMMARY OF THE INVENTION

The present invention has been accomplished under these circumstances and its principal object is to provide an image display method which is capable of setting various modes of display in desired combinations and which, if a particular display mode is set, can control display in accordance with that particular display mode and which can display an image in response to a person located in front of an image display apparatus.

In particular, the invention aims at providing an image display method by which desired information can be watched anywhere automatically and continuously without carrying any image display equipment along. Another specific object of the invention is to provide an image display method by which a certain content that may interest persons around an image display apparatus can be represented in a most effective manner. Yet another specific object of the invention is to provide an image display method by which the content to be reproduced with an image display apparatus can be set automatically in accordance with the cellular equipment owned by a person. Still another specific object of the invention is to provide an image display method which can customize modes of display such as on the display screen and input screen of an image display apparatus.

In order to attain the object described above, the present invention provides an image display method comprising: displaying image information to be viewed by a person on display screens of a plurality of display apparatuses; being capable of setting a mode of display as a registrable mode which comprises combination of at least two selectable items selected from the group consisting of presence or absence of need for tracking display, presence or absence of need for continued display, presence or absence of need for identification of the person, and setting of a stop condition; and controlling the display of the image information on the display screens of the plurality of display apparatuses in accordance with the setting of the registrable mode.

Preferably, as the registrable mode, the need for the tracking display is set to the presence and the stop condition is set disappearance of the person, and the method comprises: storing viewing information by which the presence of the person who is viewing the image information displayed on a display screen is keyed to display content of the image information being viewed; detecting the presence of the person who has entered viewable area of the display screen; choosing the display content to be displayed based on the viewing information; and displaying the chosen display content.

Preferably, the presence or absence of the need for continued display is set in accordance with the display content to be displayed of the image information.

Preferably, the viewing information further contains information about progress of viewing which indicates extent to which the display content has been viewed and wherein based on the information about the progress of viewing, the chosen display content is displayed from the last scene of already viewed content or the next scene.

Preferably, at the time when the person disappears from the viewable area of the display screen, a scene displayed on the display screen at that point in time is recorded in the information about the progress of viewing as the last scene of the already viewed content.

Preferably, as the registrable mode, the need for the identification of the person is set to the presence and the stop condition is set disappearance of the person, the information about the progress of viewing keys the person who is viewing the image information displayed on the display screen to the display content of the image information being viewed by the person, detection of the presence of the person is such that when the person who has been viewing the image information enters the viewable area of the display screen, the person is identified or the presence of the person is detected, and the display content to be displayed is chosen based on the viewing information for the person.

Preferably, the viewing information further contains information about the progress of viewing which indicates the extent to which the display content has been viewed and wherein based on the information about the progress of viewing, the chosen display content is displayed from the last scene of the content the person has already viewed or the next scene.

Preferably, when the person goes out of the viewable area of the display screen, a scene displayed on the display screen at that point in time is recorded in the information about the progress of viewing for the person as the last scene the person has already viewed.

Preferably, in order to identify or detect the person who entered the viewable area of the display screen, individual registrable information that describes character of each person is recorded preliminarily, and by identifying the person or by obtaining the position information about each person, the person who is present within the viewable area of the display screen is determined.

Preferably, as the registrable mode, the need for the tracking display is set to the presence and the need for the identification of the person is set to the presence for a plurality of persons, and the method comprises: preliminarily identifying individual persons and recording individual registrable information describing the character of each person; obtaining position information about each person; evaluating character of the person who is present within a viewable area of the display screen from the position information and the individual registrable information; and determining content to be displayed on the display screen based on the thus evaluated character of the person.

Preferably, if a plurality of persons are present within the viewable area of the display screen, the content to be displayed on the display screen is determined based on either the character of majority group or priorities given to the evaluated characters of the persons.

Preferably, as the registrable mode, the needs for tracking display and the identification of the person are both set to the presence, and the method comprises: preliminarily registering individual equipment information that identifies a cellular equipment owned by each individual person among a plurality of persons; verifying the individual equipment information between each of the display apparatuses and the cellular equipment owned by each individual person; and automatically setting content to be reproduced and displayed on the display screen based on the verified individual equipment information.

Preferably, as the registrable mode, the need for the tracking display is set to the presence and the need for the identification of the person is set to the presence for a plurality of persons, and the method comprises: preliminarily identifying individual persons and recording individual registrable information about each person; the display apparatus acquiring individual registrable information about the person who is within viewable area of its display screen; and customizing the mode of display on the display screen based on the acquired individual registrable information.

In order to attain the object described above, the present invention provides an image display method comprising: preliminarily registering equipment information that identifies a cellular equipment owned by each individual person; verifying the equipment information between a display apparatus and the cellular equipment owned by each individual person; and automatically setting content to be reproduced and displayed on the display screen of the display apparatus based on the verified equipment information.

Preferably, the equipment information contains information that identifies the cellular equipment, the display apparatus reading from the cellular equipment the information that identifies it, and wherein based on the thus read identifying information, the content to be reproduced and displayed on the display screen is read from a registered site of access and the thus read content is reproduced and displayed on the display screen.

Preferably, the cellular equipment reads from the display apparatus the identifying information that identifies the display apparatus and transmits the thus read identifying information to a registered site of access, and the registered site of access locates the display apparatus from the transmitted identifying information, transmits to the display apparatus the content to be reproduced and displayed on its display screen and causes the transmitted content to be displayed on the display screen.

In order to attain the object described above, the present invention provides an image display method comprising: preliminarily identifying a plurality of individual persons and recording individual registrable information about each person; acquiring the individual registrable information about a person who is within a viewable area of a display screen of equipment having capacity to display; and customizing mode of display on the display screen based on the acquired individual registrable information.

Preferably, the individual registrable information contains information that identifies the persons and wherein the equipment having the capacity to display reads the identifying information from the individual registrable information, uses the thus read identifying information to read a customized mode of display on the display screen from a registered site of access, and changes the display on the display screen in accordance with the settings of the customized mode of display thus read.

Preferably, the mode of display on the display screen or screens can be set in accordance with the content displayed on the display screen or screens of the display apparatus or apparatuses.

THE PREFERRED EMBODIMENTS OF THE INVENTION

Figure 1:
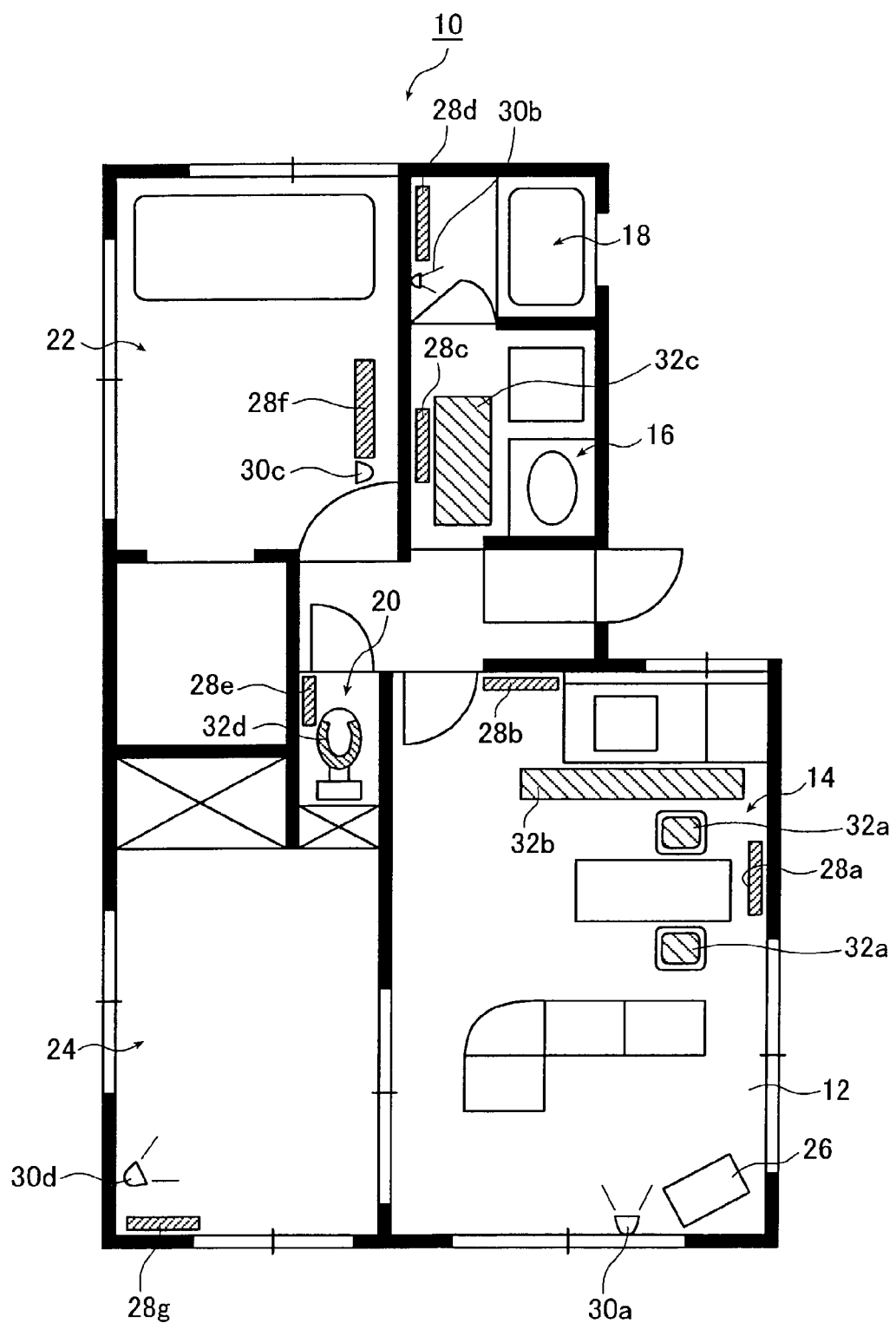
FIG. 1 illustrates the layout of a house in which an image display apparatus and a human sensor are installed in almost all rooms and areas according to the first embodiment of the invention.

The image display methods of the invention are described below in detail with reference to the preferred embodiments shown in the accompanying drawings.

The present invention provides image display methods characterized by their controlling capacity to change the method and format of display in accordance with a registered mode of display which comprises the combination of selectable items including (1) the presence or absence of the need for tracking display, (2) the presence or absence of the need for continued display, (3) the presence or absence of the need to identify the person, and (4) the setting of a stop condition.

"Tracking display" as used herein means that the method and format of display follows the movement of a person and may be exemplified by a case where successive images are represented on a display screen of an image display apparatus (monitor) at every place to which the person has moved. If tracking display is set, it may be "complete tracking display of a person" (viewing is desired in any place or room) or "site-specific tracking display" (viewing is only desired in a specified place or room). No tracking display may of course be set.

If "continued display" is set, the mode is such that as soon as a person leaves a display screen of an image display apparatus in the place to which he has moved, the scene of the displayed image (e.g. moving picture) stops and when the person is in front of a monitor in another place to which he has moved, the image restarts from the frozen scene. If "no continued display" is set, the mode is such that the scene of the displayed image (e.g. moving picture) is not stopped at a particular time in response to the movement of a person but keeps moving and is represented at the appropriate time on a monitor in a place to which the person has moved. If the image is a recorded image, it is easy to set "continued display" but in case of live programs or events such as sports, it is easy to set "no continued display" and let successive scenes to be broadcast every moment without interruption.

If "identify the person" is set, the mode is for identifying the person who is viewing the monitor and may be exemplified by setting a mode for each member of a family. If "not identify the person" mode is set, an image is displayed on the monitor on the condition that there is at least one person who views the monitor. If only one person lives in a house, there is no need to identify the person, so "not identify the person" can be set.

If "stop condition" is set, the mode is for presetting the condition for stopping display on the monitor the person is currently viewing. Display on the monitor may be stopped when the person leaves the room or his seat, moves to another place, or when a visitor comes, a home electronic product stops operating, or when a phone rings.

To begin with, we describe the first embodiment of the invention.

In the first embodiment of the invention, an image display apparatus and a human sensor are installed everywhere in the same building, for example, in a house so that anywhere in the house a person may go, he can continue to watch the content of the display he has been watching before. In this case, the following modes are registered: "tracking display" and "continued display" are both set to "yes"; the stop condition is "there is no longer the person"; "identify the person" is set to "arbitrary".

FIG. 1 illustrates the layout of a house 10 which is configured as a system in which the image display method of the invention is to be implemented; an image display apparatus and a human sensor are installed in almost all rooms and areas of the house 10.

In the house 10, a TV set 26 is placed in a living room 12, small-thickness image display apparatuses 28a and 28b are installed on the wall of a kitchen and a small-thickness image display apparatus 28c is also installed on the wall of a room with washing facilities 16; an image display apparatus 28d installed on the wall of a bathroom 18, an image display apparatus 28e on the wall of a toilet 20, an image display apparatus 28f on the wall of a bedroom 22, and an image display apparatus 28g on the wall of a room 24.

Image display apparatuses 28a-28g are all in small thickness and are not limited to any particular type but may be exemplified by liquid-crystal small-thickness displays, EL (electroluminescence) display apparatus and electronic paper.

These small-thickness image display apparatuses can be installed in any place without taking unduly large space, so they do not present the problem of installation space encountered with the conventional TV sets using CRT.

Note that the TV set 26 and the image display apparatuses 28a-28g are connected to a personal computer to be capable of displaying not only ordinary TV programs but also the information taken over the Internet.

Various rooms and areas of the house 10 are also furnished with human sensors in order to identify the person within the viewable areas of the TV 26 and the image display apparatuses 28a-28g or to detect his or her presence in those viewable areas.

For example, human sensors 30a, 30b, 30c and 30d such as CCD cameras or infrared sensors are installed in the living room 12, bathroom 18, bedroom 22 and room 24, respectively. A body weight sensor 32a is installed on chairs in the kitchen 14, body weight sensors 32b and 32c on the floors of the kitchen 14 and the room with washing facilities 16, and a body weight sensor 32d on the seat of a bowl in the toilet 20.

The TV set 26, image display apparatuses 28a-28g, as well as the human sensors 30a-30d and body weight sensors 32a-32d are connected to an in-house personal computer's server and managed and controlled by it.

The human sensors 30a-30d have the viewable areas of the respective display apparatuses in their visual fields; each human sensor takes the picture of the person as he enters its visual field and sends the captured data to the aforementioned in-house personal computer's server. In order to identify each member of the family, the in-house personal computer's server matches up the captured data with the image, say, the face image that indicates the preliminarily registered characters of the member. Besides this recognition by face, persons may be identified by voice collected by voice recording means.

The members of a family could generally be identified by their body weight alone; when the body weight sensors 32a-32d send the detected body weight to the in-house personal computer's server, the server identifies the person from his preliminarily registered body weight. If a member of the family undergoes a change in the body weight that exceeds a certain level, the setting of his or her body weight in the in-house personal computer's server shall be altered.

If only one person lives in a house, there is no need to identify the person in the house and all that is necessary is to detect the presence of the person. Therefore, in this case, the human sensors 30a-30d may simply detect the person and need not have the capacity to identify who he is.

The places where the image display apparatus and human sensor are to be installed are not limited to the walls of the rooms and areas mentioned above and may include besides various other places including doors, fusuma, shoji and ceilings.

The human sensors for identifying different persons are not limited to the above-mentioned detecting means, either. If possible, the identifying ID of each person is recorded on an ultra-small electric wave transmitter such as the most recently developed, ultra-small non-contact chip or powdered IC chip, which is then carried along by each person; the signal from the transmitter is received by an electric wave receiver which then detects the identifying ID of each person to distinguish him from another person.

If desired, the electric wave transmitter may double as a remote control.

Further, it is possible to perform the method such that the IC tag recording the ID of the position information as means for acquiring the present position information of each individual person is located for every predetermined point, the ID of the position information of the located IC tag is read with the equipment having the IC tag sensor which each individual person carries, and then the position information of the read ID as well as the identifying ID of the individual person are transmitted to the in-house server. Therefore, by using the method, the location of each individual person can be grasped and the person in the front of the display apparatus can be identified.

To use the above-described system which enables the content of display to be watched continuously anywhere in a house, every member of the family preliminarily registers his or her display request in an in-house personal computer's server. Display request is made by designating the area that interests a respective person and the display mode he or she desires. An example of the area that interests a respective person is a TV program or, in the case of the Internet, politics, sports, local news, entertainment, etc. as are found in journals, magazines and newspapers.

There are two modes for tracking display of a person, complete person tracking mode and site-specific tracking mode. In complete person tracking mode, the content of display the person has been watching is continuously represented on the image display apparatus in whichever area of the house he has moved to. In site-specific tracking mode, display is only effected when the person is in the place (room) he designated; the display is interrupted when the person leaves the room and a sequel to the interrupted display is resumed when the person returns to the room.

Suppose that a person designated the complete person tracking mode in the house 10. The person has been watching the TV 26 in the living room 12. When the scene is N1, he leaves the living room 12 and goes to the bathroom 18. When the human sensor 30a in the living room 12 recognizes that the person is no longer within the viewable area of the TV 26, the scene N1 of the currently displayed content is automatically recorded in the personal computer's server together with the ID of the person. When the person leaves the living room 12, an instruction from the personal computer's server turns off the TV 26 in the living room 12.

When the human sensor 30b in the bathroom 18 detects the person and the personal computer's server recognizes him, an instruction from the server causes the last scene N1 (or its sequel) to be represented on the image display apparatus 28d in the bathroom 18. In this case, the capacity of a digital TV set or a personal computer to accumulate data may be used to accumulate data for the sequel to the last scene N1 (which was broadcast while the person was moving to the bathroom 18) so that display can be resumed from the scene N1 (or its sequel) when the person has moved to the bathroom 18.

When the person leaves the bathroom 18, the human sensor 30b detects the fact and the last scene N2 of the currently displayed content is recorded in the personal computer's server together with the ID of the person, whereupon the display on the image display apparatus 28d in the bathroom 18 is turned off.

The person then goes to the bedroom 22, the human sensor 30c detects the person and the personal computer's server identifies the person, whereupon display is resumed from the last scene N2 (or its sequel).

Thus, in the complete person tracking mode, the person moves from one room to another in the house without carrying a remote control or the like along and still the displayed content of the image he is watching is automatically continued to be represented on the image display apparatus in whichever place he has moved to.

For instance, if the person goes to the toilet 20 and sits on the bowl, the body weight sensor 32d installed on the bowl's seat detects the person and an image which is sequel to the last scene is represented on the image display apparatus 28e on the wall of the toilet 20. If the person wishing to brush his teeth goes to the room with washing facilities 16, the body weight sensor 32c installed on the floor of the room 16 detects the person and the image which is a sequel to the last scene is represented on the image display apparatus 28c on the wall of the room 16.

Needless to say, if each of the image display apparatuses 28a-28g is fitted with a remote control, the person can use it to change channels or take special actions such as frame feed/reverse and fast forward/reverse; when the current program is over or if the person wants to stop watching it, he may use the remote control to turn off the display on the image display apparatus. Once the display is turned off, tracking display is no longer effected.

If the TV 26 is switched to a different channel, tracking is now effected for the program on that channel and the person can keep watching a sequel on the program.

We next describe the case where a person designated the site-specific tracking mode in the house 10. Suppose the person who designated the site-specific tracking mode is watching the TV 26 in the living room 12. When the displayed content is scene N3, the person leaves the living room 12 to go to the toilet 20; the human sensor 30a detects the fact and the personal computer's server, recognizing the person, automatically records the currently displayed scene N3. While the person is in the toilet 20, the display is interrupted and as already mentioned, the content being broadcast during the period is saved by the data accumulating capacity of a digital TV set or a personal computer.

When the person returns to the living room 12 and the human sensor 30a recognizes that the person has got into the viewable area of the TV 26, the personal computer's server gives such an instruction that the saved and accumulated data be displayed on the TV 26 as continued from a scene N4 which is a sequel to the last scene N3.

In the site-specific tracking mode, image display is only continued when the person is in a predetermined place, so this mode is particularly suitable for the case where the person suspends watching TV to do something in a different place and watches the sequel leisurely after finishing the job.

Each member of the family in the house may register his or her ID and display request in the personal computer's server so that display can be controlled by each member of the family. Assume, for example, the case where the father is watching TV 26 in the living room 12, the mother is looking at the image display apparatus 28b on the wall of the kitchen 14 while she is making preparations for a meal, and their child is looking at the image display apparatus 28g in the room 24. In this case, display is controlled by the personal computer's server in accordance with the mode set by each person.

As an alternative to the method of identifying persons by recognizing their face with a human sensor, each member of the family may carry an ultra-small signal transmitter along (for the meaning of the ultra-small signal transmitter, see above) so that it transmits individual identifying ID information and the information is then received by a signal receiver and forwarded to the personal computer's server. This method has the advantage of providing greater ease in identifying each person.

In accordance with the request preliminarily registered by the person, image or text or voice is represented and output as appropriate. As already mentioned, the person is free to change channels by a suitable means such as a remote control and this ensures tracking of the latest content of display.

If the person moves to a different room where another person is looking at the image display apparatus, the display screen may be split into two portions or, alternatively, the content of display may be given a scale of priorities by person.

We next describe the second embodiment of the invention.

In the first embodiment described above, a person is tracked within a single building, say, a house so that image is displayed continuously. In the second embodiment, a person going out of the house is tracked in more than one public facility or the like so that information such as image information is displayed continuously. In this case, the following modes are registered: "tracking display", "continued display" and "identify the person" are set to "yes"; the stop condition is "there is no longer the person".

Figure 2:
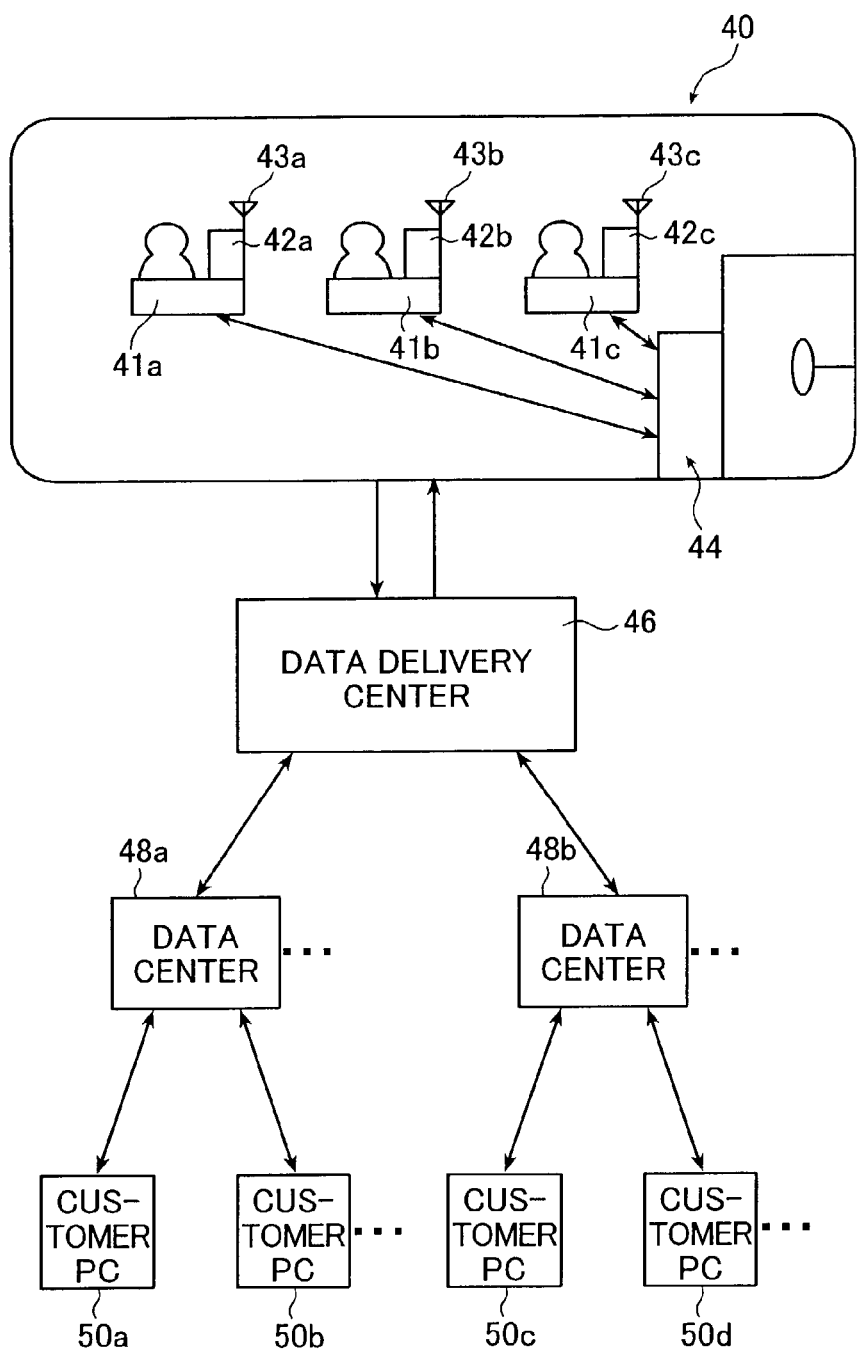
FIG. 2 is a block diagram showing an outline for a system that allows an image to be looked at continuously in a bus according to the second embodiment of the invention.

FIG. 2 is a block diagram illustrating an outline for a system that implements the image display method of the invention which is adapted to enable continued image viewing in a bus as an example of public facilities.

In FIG. 2, the bus generally indicated by 40 has passenger seats 41a, 41b, 41c, . . . which are respectively fitted with image display apparatuses 42a, 42b, 42c, . . . and (electric wave) receivers 43a, 43b, 43c, . . . The image display apparatuses 42a, 42b, 42c, . . . and the electric wave receivers 43a, 43b, 43c, . . . are each controlled by a control server 44 installed in the bus 40 and to which they are connected.

The control server 44 in the bus 40 is connected to a data delivery center 46 by radio communication. The data delivery center 46 is connected to data centers 48a, 48b, . . . by either radio or cable. Customers have personal computers (PCs) 50a, 50b, 50c, 50d, . . . which are registered in the data centers 48a, 48b, . . . to which they are connected by either radio or cable.

Each person (customer) may use his or her PC 50a, . . . at home, obtain information over the Internet through the data centers 48a, . . . and display image.

If the person has something to attend to and must go out of the house while the obtained information is being displayed, he or she is supposed to carry a small signal transmitter along which is capable of transmitting ID information that identifies the person. The signal transmitter may be of such a type that the ID information for each person is recorded in the most recently developed ultra-small electric wave transmitter such as an ultra-small non-contact chip or a powdered IC chip which were already described in connection with the first embodiment of the invention. The ID information for an individual person shall contain data about the data center which registers that person.

Suppose that a person is operating the customer PC 50a at home to get information over the Internet and is having the information displayed on the screen. The person then leaves home for some reason. In this case, the data center 48a at which the customer PC 50a is registered records the information about the extent to which the person has been looking at the information he obtained over the Internet. Also suppose that the person gets in the bus 40 and sits on the passenger seat 41a. The person carries a signal transmitter along which transmits ID information that helps identify the person. The signal receiver 43a beside the seat 41a receives the ID information being sent from the transmitter carried by the person and the receiver transfers the received ID information to the control server 44 on the bus 40.

The control server 44 receives individual ID information about passengers on the bus 40 (including the person of interest) and forwards it to the data delivery center 46.

Using the received individual ID information about several persons (passengers), the data delivery center 46 accesses the data centers 48a, etc. at which the customer PCs 50a, etc. are registered. At the data centers 48a, etc., the individual ID information about the person of interest is used as a basis on which the displayed content of the Internet information the person has been looking at is transferred to the data delivery center 46 from the data delivered as the sequel to that content of display.

If desired, the data delivery center 46 may directly retrieve the necessary data from the respective individual customer PCs 50a, etc. via the data centers 48a, etc.

Upon receiving the delivered data, the data delivery center 46 transfers it to the control server 44 on the bus 40. Upon receiving the delivered data, the control server 44 bases on the relevant individual ID information to have the image display apparatus 42a beside the seat 41a of the person represent the sequel to the displayed content the person has been looking at before in home. If the person leaves the seat 41a and the receiver 43a beside it detects the fact, the display is interrupted. The interrupted information is passed through the control server 44 to be transferred to the data center 48a at which the person's customer PC 50a is registered.

As described above, if the person goes out of his home carrying along a small signal transmitter containing his individual ID information, it is always possible for him to keep looking at the displayed content of the Internet information by utilizing a facility equipped with the necessary devices including a control server, an electric wave receiver and an image display apparatus. As a result, the person can enjoy image and other information by automatic tracking not only at his home but also in public facilities.

In the second embodiment of the invention, data to be transferred is desirably transmitted and received in special codes.

We next describe the third embodiment of the invention. In the third embodiment, many and unspecified persons around an image display apparatus are considered as a target group and a content that may interest those persons is displayed. More specifically, a large display device is installed on the wall of a building, a side of the body of a bus, etc. and an advertisement that may interest the group of persons around the display device is represented on it. In this case, the following modes are registered: "tracking display" and "identify the person" are both set to "yea".

Figure 3:
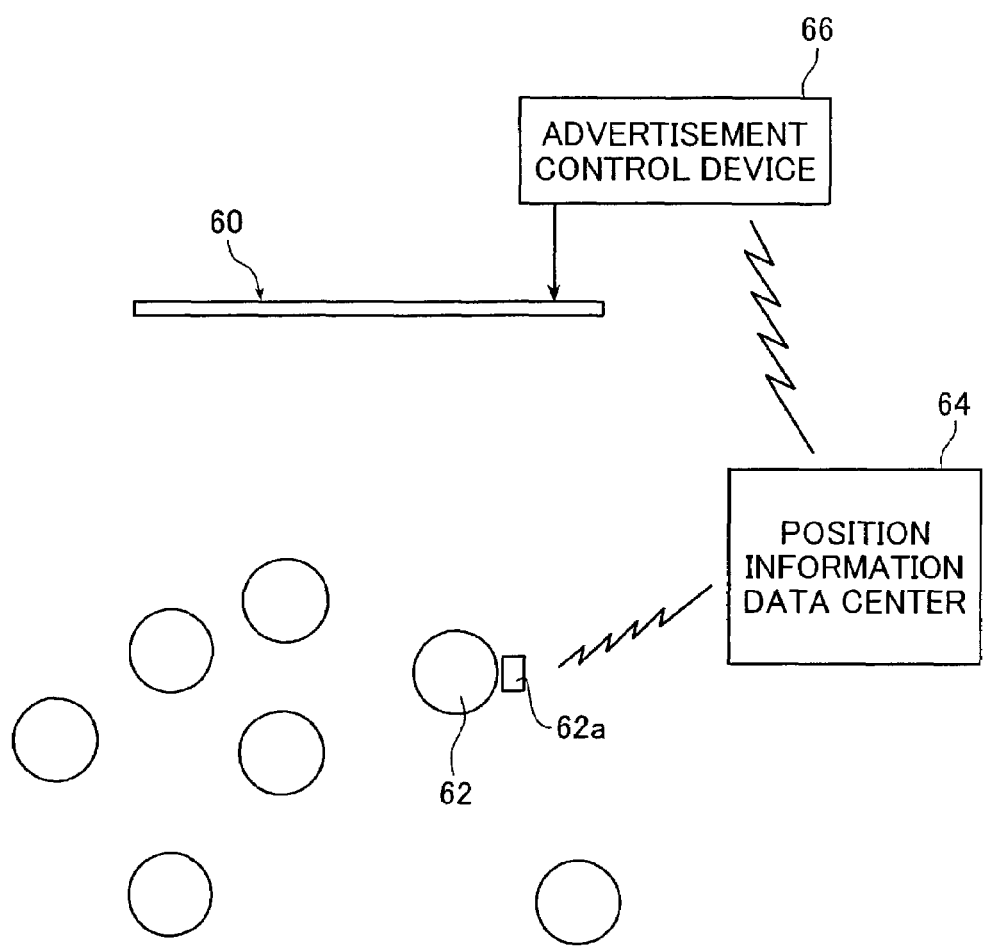
FIG. 3 illustrates an outline for the image display method according to the third embodiment of the invention.

FIG. 3 is a block diagram illustrating an outline for a system that implements the image display method in the third embodiment of the invention. In FIG. 3, an image display apparatus 60 that is installed on the wall of a building is adapted to display an advertisement that may interest the group of potential customers such as passersby 62 in the neighborhood of the apparatus 60.

The image display apparatus 60 has a big screen for displaying an advertisement. Although it is not limited to any particular type, it preferably has a thin-walled structure as exemplified by a liquid-crystal display, a fluorescent display tube or a plasma display. In recent years, very thin devices have been developed as exemplified by electronic paper and EL and this is going to make it feasible to display an advertisement of a fairly large area such as one that covers the entire surface of the wall of a building.

Suppose each passerby 62 carries a communication terminal such as a PDA (or cell phone) 62a, etc. and that he is a subscriber to a GPS or otherwise based position information service.

The current position of each passerby 62 is known on a real-time basis by a position information data center 64. Also suppose that various kinds of information about each of the passersby 62 who are subscribers to the position information service (e.g. information describing the target customer group such as about sex, age and occupation, information about preferences such as an individual's preference) were already registered at the position information data center 64.

After knowing the current position of each passerby 62, the position information data center 64 determines, on the basis of the position information and preliminarily registered individual information about each passerby 62, the group of potential customers to which the passerby of interest belongs and also determines what person (belonging to a certain group of potential customers) is located in what position; thereafter, the position information data center 64 transfers the relevant data on customer group to an advertisement control device 66 which controls the aforementioned image display apparatus 60.

Upon receiving the data on customer group, the advertisement control device 66 determines which group of potential customers are abundant around the image display apparatus 60 and displays an advertisement that may interest the persons classified in the customer group of highest percentage.

The position information data center 64 is constantly getting the position information about the passersby 62 around the image display apparatus 60 and transfers the data on customer group to the advertisement control device 66 at given intervals. Every time the percentage of a certain customer group changes, the advertisement control device 66 causes the image display apparatus 60 to display an advertisement that may interest the potential customers in the highest percentage group who are around the image display apparatus 60.

If desired, the classification of customer groups may be based on a scale of priorities. Priorities may be adjusted within a day according to time zone or within a year according to season.

Sometimes, there may be only few persons around the image display apparatus 66. In this case, if the preference or the like of each person has been registered at the position information data center 64, an advertisement that may interest each person may be displayed.

Since the position of each person is already known, the mode of display may be so changed as to give an optimum display for the position of the person who is considered to be the target of the advertisement. For example, if the person who is the target of the advertisement is not right in front of the display screen of the image display apparatus 60 but is offset to one side, the image to be displayed may be subjected to projection transformation or otherwise treated to produce an image that is not distorted in shape as seen from the person who is the target of the advertisement.

As described above, a GPS or otherwise based position information service is combined with the registration of the individual information about each person whose position has been identified by the service and this enables a more effective advertisement to be offered that seems best suited to a particular group of potential customers.

In the third embodiment, it is not absolutely necessary to use the position information about passersby 62; instead, the PDA (or cell phone) carried by each passerby 62 may have direct communication with the advertisement control device 66 which then determines which group of potential customers the passerby belongs to and accordingly controls the display of an advertisement.

We next describe the fourth embodiment of the invention.

In the first embodiment, a person is tracked within a single building, say, a house to ensure that an image is continuously displayed. In the fourth embodiment, a person is supposed to watch an image (moving picture) on the display screen of a single TV set (image display apparatus); if there occurs a certain event that meets one of the preset stop conditions, the viewing person is tracked to ensure that the image is continuously displayed. In this case, the following modes are registered: "tracking display" and "continued display" are both set to "yes"; and a plurality of stop conditions are preliminarily set.

Figure 4:
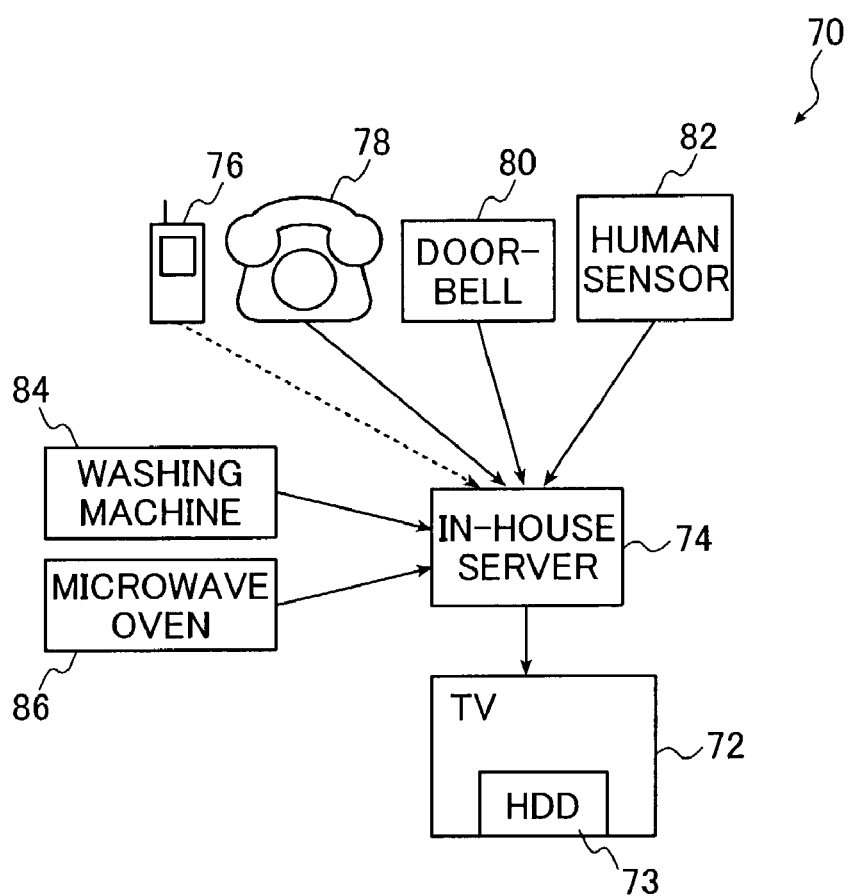
FIG. 4 illustrates an outline for the image display method according to the fourth embodiment of the invention.

FIG. 4 shows schematically an image display system which implements the image display method according to the fourth embodiment of the invention.

The image display system generally indicated by 70 in FIG. 4 comprise a home TV set (image display apparatus) 72, an in-house server 74 connected to the TV set 72, and various home electronic appliances that are connected to the in-house server 74, as exemplified by a cell phone 76, a fixed phone 78, a front doorbell 80, a human sensor 82, a washing machine 84 and a microwave oven 86.

The home electronic appliances such as the cell phone 76, fixed phone 78, front doorbell 80, human sensor 82, washing machine 84 and microwave oven 86 are used to set various stop conditions in the TV set 72 and they are each connected to the in-house server 74 by either cable or radio.

The TV set 72 has a hard disk drive (HDD) 73 in which an image (moving picture) being displayed on the screen is recorded and stored.

The human sensor 82 may be the one that can be used in the first embodiment of the invention.

The image display system 70 shown in FIG. 4 may be so adapted that the TV set 72 will stop under various conditions such as where a call is received by the cell phone 76, fixed phone 78, etc., a visitor, etc. rings the doorbell 80, a home electronic appliance such as the washing machine 84 or microwave oven 86 stops operating, and where the human sensor 82 recognizes that a person is outside the viewable area of the TV set 72 as a result of, for example, having left the room.

If an interrupt that corresponds to any one of the preliminarily set stop conditions occurs to the image display system 70 shown in FIG. 4, the HDD 73 in the TV set 72 starts automatic recording of the program being viewed. At this point of time, the person (viewer) of interest goes outside of the viewable area of the screen of the TV set 72. It is therefore preferred that the image being broadcast is no longer displayed on the screen of the TV 72 but, if desired, the image may be kept displayed.

Thereafter, at the point in time when the person (viewer) returns to the viewable area of the screen of the TV set 72, the HDD 73 in the TV 72 stops automatic recording of the scenes of the image being broadcast.

Subsequently, the HDD 73 starts to reproduce, on the screen of the TV 72, the image (moving picture) that was recorded to the HDD73 while the viewer was away. In the meantime, the HDD 73 records the image being broadcast while the reproduction is going on. This is commonly called "catch-up playback and recording". By omitting the reproduction of CM (commercials) in the broadcast scenes of the recorded program, the time difference between a recorded and reproduced scene and an actually broadcast scene can be shortened progressively.

As a result, the recorded and reproduced scene catches up with the scene being actually broadcast and at that point in time, the HDD 73 stops recording the broadcast scene.

Thus, the viewer can continue to watch the scenes that were broadcast with the TV 72 and which he could not watch on account of the interrupt that corresponded to one of the present stop conditions.

A fifth embodiment is also possible for the present invention. In this embodiment, a plurality of individual persons are preliminarily identified and individual information about each person is also registered preliminarily; the individual information registered for a particular person who is within the viewable area of the display screen is then acquired and the mode of display on the display and input screens can be customized on the basis of the acquired individual information.

More particularly, in the fifth embodiment of the invention, the mode of display on the display and input screens can be customized in accordance with person, say, viewer or with the image display apparatus or the equipment having the capacity to display such as TV or monitor which are to be used by the person; as a result, a desired mode of display on the display and input screens can be designated and registered.

To take an example, suppose you are watching TV at home; if the program you are watching is broadcast as teletext, it is preferable to change the display of character data in accordance with the viewer. If you are a child, kanji characters in the display may be changed to hiragana characters. If you are elderly, all characters may be displayed enlarged. The viewer may be identified as described above in connection with the first to fourth embodiments.

The fifth embodiment may be applied to the first embodiment by setting the following modes: "tracking display" and "identify the person" are both set to "yes"; the individual members of a family are preliminarily identified and individual information about each member person is registered.

Another example concerns public places such as stations of transportation facilities; in this case, the mode of display on the screen, in particular, on the menu screen which needs entry to a touch panel, as found with ticketing machines or a variety of automatic vending machines may be changed in accordance with user. If the user is elderly, it is preferable to design an easy-to-operate machine by enlarging the screen and characters, reducing the number of select (enter) buttons and increasing the number of input steps.

Again, the user may be identified as described above in connection with the first to fourth embodiments. In one example, the ticking or vending machine reads the ID card or the like presented by the user to get the ID information (data) about the individual; the machine then accesses a specified server registered in the ID information, reads the mode of display preset by the individual and changes the display in accordance with the preset mode. Alternatively, the data for mode setting may be recorded on the IC chip in the ID card of an individual and the ticketing or vending machine reads the data and changes the display in accordance with the preset mode.

A sixth embodiment is also possible for the present invention. In this embodiment, equipment information that identifies the cellular equipment owned by individuals is registered and verified between a display apparatus and the cellular equipment owned by each individual; the content that is to be reproduced and displayed on the screen of the display apparatus can be automatically set on the basis of the verified equipment information.

Thus, in the sixth embodiment, the content to be reproduced and displayed on the screen of an image display apparatus such as TV or monitor can be automatically set in accordance with the cellular equipment owned by a person, say, a viewer.

Consider, for example, the case where a camera with communicating capabilities (which may be fitted with a monitor) is brought close enough to the screen of an image display apparatus so that from the camera, its ID is read by the display apparatus which then accesses a particular site registered in the camera's ID, say, the personal computer of the owner of the camera and a recorded image is read from the accessed site and displayed. The image to be displayed may be the image that was taken with the camera and/or the image that was taken by the owner of the camera; it may also be an image that was taken recently or it may be any one of the images that were taken thereafter over the period up to the day on which the personal computer was accessed.

In the case under consideration, the recorded image can be verified on a large screen of an image display apparatus that is encountered when the person is away from his home. Even if the camera is fitted with a monitor, the monitor on the camera is usually so small that it is sometimes difficult to check for the quality of the recorded image. Suppose you are out of your office and take a picture with your camera. In order to deal with the difficulty described just above, you download the recorded picture into your personal computer after you get back to your office and bring your camera close enough to a big-screen image display apparatus so that the recorded image is displayed on the large screen and its details can be closely checked for their quality.

The sixth embodiment may be applied to the first embodiment by setting the following modes: "tracking display" and "identify the person" are both set to "yes"; a plurality of individual persons are preliminarily identified and individual information about each person is registered.

In the various embodiments described above, input data for controlling the display on the screen of a variety of display equipment such as an image display apparatus and equipment having the capacity to display image is entered by means of an input function, say, a touch panel, on the display equipment side and transmitted via control equipment on the display equipment side which, in the second embodiment shown in FIG. 2, is the control server 44 on the bus 40 and the data delivery center 46. Alternatively, the input data may be transmitted to the server and the like using the communication equipment owned by the viewer, user, etc. as exemplified by cellular information equipment (e.g. a cell phone and PDA) and other cellular equipment (terminal) such as equipment having communicating capabilities.

If the contents of your personal computer, TV or video recorder or the images captured by your PC or video recorder are to be enjoyed when you are away from your home (see, for example, the second embodiment shown in FIG. 2 and the sixth embodiment), screen change, channel change and control of display mode such as playback/stop/ fast forward/return may be entered by manipulating keys on cellular equipment and the entered data can also be transmitted with the cellular equipment.

In the various embodiments described above, the display equipment reads the ID information about an individual person and cellular equipment from the ID card and cellular equipment owned by the individual person and in this way the individual person is associated with the display apparatus to be identified. In another possible case of the invention, the cellular equipment owned by an individual person reads the ID information about display equipment such as a monitor and the thus read ID information about the display equipment is sent via the cellular equipment to a specified site to be accessed, such as a center; the accessed site locates the address of the display equipment and sends display data to the display apparatus which then displays image.

In the various embodiments described above, it is assumed that an image to be viewed or enjoyed from a single program is displayed on the entire surface of a single screen of a display apparatus and that the same image is viewed by one or more persons. This is not the sole case of the invention and a plurality of split images may be displayed on a large screen of a display apparatus and viewed by a corresponding number of persons; alternatively, one image may be displayed enlarged so that it can be viewed by one or more persons.

Figure 5A:
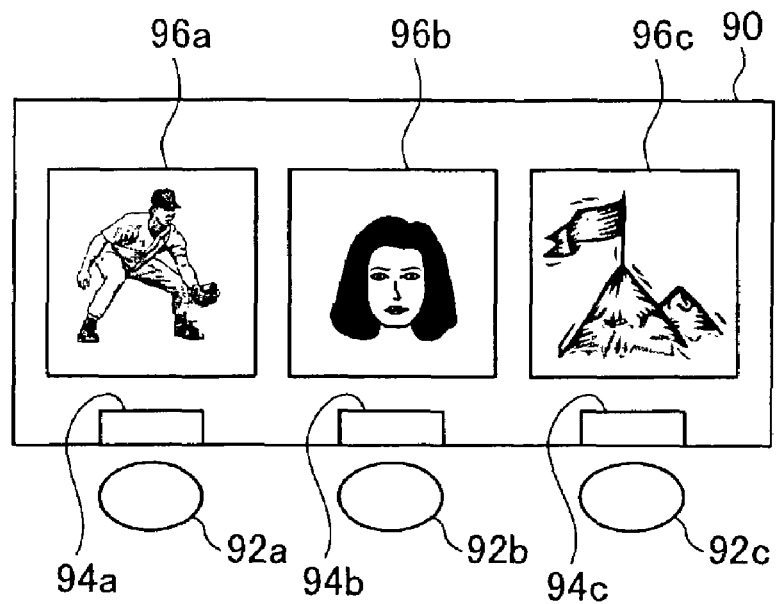
FIG. 5A illustrates schematically an example of the image display method of the invention.
Figure 5B:
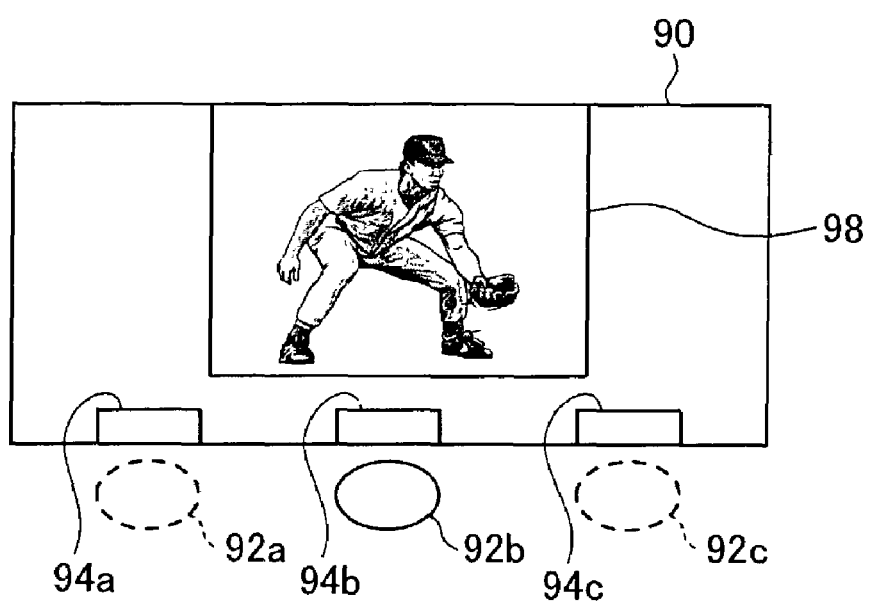
FIG. 5B illustrates schematically another example of the image display method of the invention.

These alternative cases are illustrated in FIGS. 5A and 5B. A display screen 90 is a large-area screen that is capable of displaying a plurality of images as split according to the number of viewers. The illustrated display screen 90 is made of electronic paper and installed on the entire surface of the top of a table or across a wall. A plurality of seat positions (three seats in the illustrated case) are shown and human sensors 92a, 92b and 92c are installed at the respective positions. In the lower part of the display screen 90, touch panel units 94a, 94b and 94c are provided in correspondence to the respective seat positions and the associated human sensors 92a, 92b and 92c.

In the display screen 90 shown in FIG. 5A, three persons take a seat in the respective seats and are detected by the respective human sensors 92a, 92b and 92c; on the display screen 90, three images 96a, 96b and 96c are displayed as split in small areas (screens) that correspond to the respective seat positions. In the case under consideration, the three persons preferably use an earphone in listening to sound so that they will not interfere with each other. The three images 96a, 96b and 96c may be automatically displayed when the human sensors 92a, 92b and 92c detect the persons who are seated at the respective seat positions; alternatively, they may be images the persons seated at the respective seat positions chose by manipulating their touch panel units 94a, 94b and 94c. Hence, the images 96a, 96b and 96c displayed split on the screen 90 may be the same or different from each other or they may be partly the same or partly different from each other.

In the case of the display screen 90 shown in FIG. 5B, only one person is seated in the center seat and only detected by the human sensor 92b, with the other human sensors 92a and 92c detecting no persons. As a result, only one image 98 is displayed on the screen 90 in an area (screen) that is bigger than the image 96a (see FIG. 5A) and which corresponds to the center seat position. Again, the image 98 may be automatically displayed when the human sensor 92b detects the person or it may the image the person seated at the (center) seat position chose by manipulating his touch panel unit 94b. In the case illustrated in FIG. 5B, the person can listen to fairly big sound from the speaker.

Even if three persons are seated at the respective seat positions and detected by the human sensors 92a, 92b and 92c, the persons may individually manipulate their touch panel units 94a, 94b and 94c to display a single image 98 on the screen 90 as shown in FIG. 5B.

The display screen 90 illustrated in FIGS. 5A and 5B can be installed in the living room of a house or in public facilities such as a library, restaurant, conference room, station, airport and an information center. The illustrated display screen 90 has an additional advantage in that the position of image display (screen position) and the size of a displayed image can be set in accordance with the positions and number of persons involved.

While various embodiments and examples have been described above in detail with respect to the image display method of the invention, they are by no means intended to limit the invention and various improvements and modifications are possible without departing from the spirit and scope of the invention.

As described above in detail, according to the present invention, various modes of display can be set in desired combinations and, if a particular mode of display is set, display can be controlled in accordance with that particular mode of display and, in addition, an image can be displayed in response to a person located in front of an image display apparatus.

In particular, the invention enables the user to watch the desired information anywhere automatically and continuously without carrying any image display equipment along.

Further, according to the invention, a certain content that may interest persons around an image display apparatus can be represented in a most effective manner and, in particular, an advertisement that may interest a particular group of potential customers can be displayed in an efficient manner.

In addition, according to the invention, the content to be reproduced with an image display apparatus can be set automatically in accordance with the cellular equipment owned by a person.

Still further, according to the invention, modes of display such as on the display screen and input screen of an image display apparatus can be customized.

What is claimed is:

1. An image display method comprising:
    displaying image information to be viewed by a person on display screens of a plurality of display apparatuses;
    being capable of setting a mode of display as a registrable mode which comprises combination of at least two selectable items selected from the group consisting of presence or absence of need for tracking display, presence or absence of need for continued display, presence or absence of need for identification of the person, and setting of a stop condition; and
    controlling the display of said image information on the display screens of said plurality of display apparatuses in accordance with the setting of said registrable mode;
    wherein as said registrable mode, said needs for tracking display and the identification of the person are both set to the presence, said method comprising:
    preliminarily registering individual equipment information that identifies a cellular equipment owned by each individual person among a plurality of persons;
    verifying said individual equipment information between each of said display apparatuses and said cellular equipment owned by each individual person; and
    automatically setting content to be reproduced and displayed on said display screen based on said verified individual equipment information.

2. The image display method according to claim 1, wherein as said registrable mode, said stop condition is further set to disappearance of the person, said method further comprising:

storing viewing information by which the presence of the person who is viewing said image information displayed on a display screen is keyed to display content of said image information being viewed;

detecting the presence of the person who has entered viewable area of said display screen;

choosing the display content to be displayed based on said viewing information; and displaying the chosen display content.

3. The image display method according to claim 2, wherein the presence or absence of the need for continued display is set in accordance with the display content to be displayed of said image information.

4. The image display method according to claim 2, wherein said viewing information further contains information about progress of viewing which indicates extent to which said display content has been viewed and wherein based on said information about the progress of viewing, said chosen display content is displayed from the last scene of already viewed content or the next scene.

5. The image display method according to claim 4, wherein at the time when said person disappears from the viewable area of said display screen, a scene displayed on the display screen at that point in time is recorded in said information about the progress of viewing as the last scene of said already viewed content.

6. The image display method according to claim 4, wherein as said registrable mode, said stop condition is further set to disappearance of the person, said information about the progress of viewing keys the person who is viewing said image information displayed on said display screen to the display content of said image information being viewed by said person, detection of the presence of said person is such that when said person who has been viewing said image information enters the viewable area of said display screen, said person is identified or the presence of said person is detected, and said display content to be displayed is chosen based on said viewing information for said person.

7. The image display method according to claim 6, wherein said viewing information further contains information about the progress of viewing which indicates the extent to which said display content has been viewed and wherein based on said information about the progress of viewing, said chosen display content is displayed from the last scene of the content said person has already viewed or the next scene.

8. The image display method according to claim 7, wherein when said person goes out of the viewable area of said display screen, a scene displayed on the display screen at that point in time is recorded in said information about the progress of viewing for said person as the last scene said person has already viewed.

9. The image display method according to claim 6, wherein in order to identify or detect said person who entered the viewable area of said display screen, individual registrable information that describes character of each person is recorded preliminarily, and by identifying said person or by obtaining the position information about each person, the person who is present within the viewable area of said display screen is determined.

10. The image display method according to claim 1, wherein said need for the identification of the person is further set to the presence for a plurality of persons, said method further comprising:

preliminarily identifying individual persons and recording individual registrable information describing the character of each person;

obtaining position information about each person;

evaluating character of the person who is present within a viewable area of said display screen from said position information and said individual registrable information; and determining content to be displayed on said display screen based on the thus evaluated character of the person.

11. The image display method according to claim 10, wherein if a plurality of persons are present within the viewable area of said display screen, the content to be displayed on said display screen is determined based on either the character of majority group or priorities given to the evaluated characters of said persons.

12. The image display method of claim 2, wherein the person is identified by at least one of sensing a weight of the person, performing facial image recognition on the person, performing voice print recognition on the person and identifying a signal transmitter carried by the person.

13. The image display method according to claim 1, wherein said need for the identification of the person is further set to the presence for a plurality of persons, said method further comprising:

preliminarily identifying individual persons and recording individual registrable information about each person;

said display apparatus acquiring individual registrable information about the person who is within viewable area of its display screen; and customizing the mode of display on said display screen based on said acquired individual registrable information.

14. The image display method according to claim 1, wherein the mode of display on said display screen or screens can be set in accordance with the content displayed on the display screen or screens of said display apparatus or apparatuses.

15. The image display method of claim 1, wherein the plurality of display apparatuses are disposed in a house.

16. The image display method of claim 1, wherein a movement of the person is tracked among the plurality of the display apparatuses.

17. The image display method of claim 1, wherein, if the need for continuous display is set to the presence, then, as the person moves from a viewable area of a display screen currently displaying the image information, the displaying of the image information stops at a predetermined frame of the image information, and resumes displaying from the predetermined frame on a display screen in which a viewable area has been entered by the person.

18. The image display method of claim 1, wherein a person in a viewable area of a display screen is identified by at least one of sensing a weight of the person, performing facial image recognition on the person, performing voice print recognition on the person and identifying a signal transmitter carried by the person.

19. The image display method of claim 1, wherein the setting of the stop condition comprises at least one of the person moving from a viewable area of a display screen currently displaying the image information, another person being detected in the viewable area of the display screen currently displaying the image information and a detection of a message directed to the person.

* * * * *